United States Patent
Chrones et al.

(10) Patent No.: US 6,185,927 B1
(45) Date of Patent: Feb. 13, 2001

(54) LIQUID TRIPROPELLANT ROCKET ENGINE COAXIAL INJECTOR

(75) Inventors: Constant J. Chrones, San Gabriel; Gordon A. Dressler, Manhattan Beach, both of CA (US)

(73) Assignee: TRW Inc., Redondo Beach, CA (US)

( * ) Notice: Under 35 U.S.C. 154(b), the term of this patent shall be extended for 0 days.

(21) Appl. No.: 08/995,563

(22) Filed: Dec. 22, 1997

(51) Int. Cl.[7] .................................................. F02K 9/52
(52) U.S. Cl. ............................ 60/258; 239/428; 239/424
(58) Field of Search ............................ 60/258, 257, 259, 60/211, 740, 742, 39.463, 915; 239/434, 426, 424, 428

(56) References Cited

U.S. PATENT DOCUMENTS

| | | | | |
|---|---|---|---|---|
| 2,453,378 | * | 11/1948 | Lubbock ................................ | 60/258 |
| 2,536,600 | * | 1/1951 | Goddard ................................ | 60/258 |
| 2,635,425 | * | 4/1953 | Thorpe et al. ....................... | 60/742 |
| 2,667,740 | * | 2/1954 | Goddard ................................ | 60/258 |
| 2,730,433 | * | 1/1956 | Cartledgw ........................... | 239/428 |
| 2,738,230 | * | 3/1956 | Pillard ................................ | 239/428 |
| 3,040,521 | * | 6/1962 | Broughton ........................... | 60/257 |
| 3,611,722 | * | 10/1971 | Schick ................................ | 60/258 |
| 3,691,765 | * | 9/1972 | Carlisle ................................ | 60/742 |
| 3,699,772 | | 10/1972 | Elverum, Jr. ....................... | 60/258 |
| 3,722,219 | * | 3/1973 | Spencer ................................ | 60/258 |
| 3,897,008 | * | 7/1975 | Dettling et al. ..................... | 239/410 |
| 4,206,594 | | 6/1980 | Elverum, Jr. ....................... | 60/258 |
| 4,771,600 | * | 9/1988 | Limerick et al. ..................... | 60/258 |

FOREIGN PATENT DOCUMENTS 621115    10/1994    (JP) .

\* cited by examiner

*Primary Examiner*—Ted Kim
(74) *Attorney, Agent, or Firm*—Michael S. Yatsko

(57) ABSTRACT

A tripropellant coaxial pintle injector for a rocket engine which enables smooth transitioning between two types of propellants that are adapted to be alternatively mixed with a third type of propellant in a combustion chamber of a rocket engine. The tripropellant coaxial injector includes a pintle for expelling a first propellant into a combustion chamber in a generally radial direction and two or more concentric metering sleeves which define orifices for expelling two or more different propellants into the combustion chamber in an axial direction thus, such a configuration allows for alternative mixing of two propellants with a third propellant in the combustion chamber of a rocket engine.

6 Claims, 1 Drawing Sheet

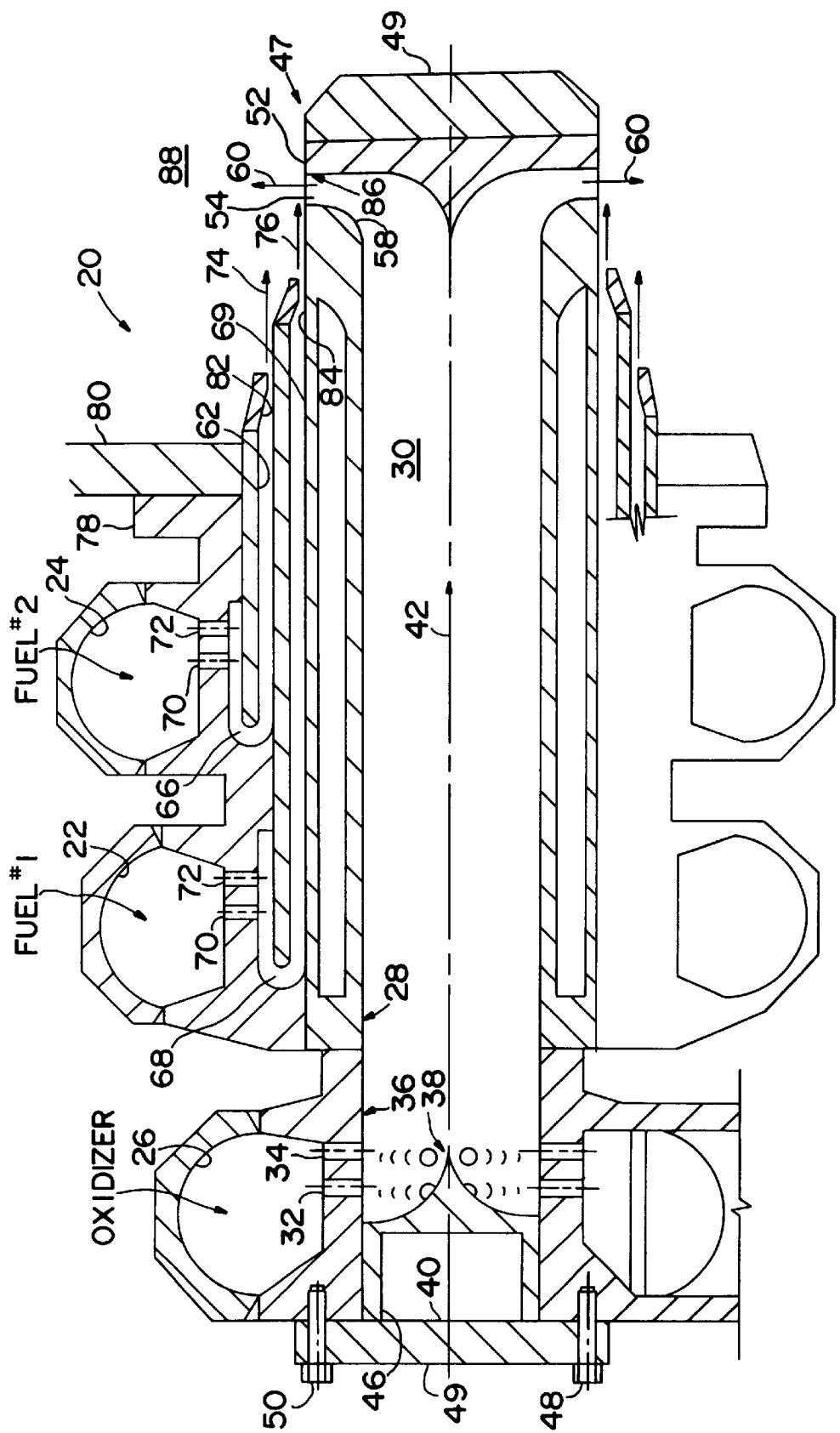

LIQUID TRIPROPELLANT ROCKET ENGINE COAXIAL INJECTOR

BACKGROUND OF THE INVENTION

1. Field of the Invention

The present invention relates to a coaxial injector for a rocket engine and more particularly, to a tripropellant coaxial injector which allows for smooth transitioning between two types of propellants that are adapted to be alternatively mixed with a third propellant in a combustion chamber of a rocket engine.

2. Description of the Prior Art

Bipropellant rocket engines are known which combine a single oxidizer propellant with a single fuel propellant in a combustion chamber in a rocket engine to form a combustion reaction to produce thrust. Examples of such bipropellant rocket engines are disclosed in U.S. Pat. Nos. 3,699,772 and 4,206,594, assigned to the same assignee as the assignee of the present invention and hereby incorporated by reference. Such bipropellant rocket engines include a coaxial injector which includes a hollow pintle and a concentrically mounted annular outer sleeve. One end of the pintle is disposed within the combustion chamber. Intermediate the end of the pintle within the combustion chamber is a fuel orifice formed by the outer annular sleeve and the outer surface of the pintle. A first propellant, such as an oxidizer, is introduced within the pintle and is diverted in a generally radial direction by way of a cone-shaped projection and alternating slots formed on the end of the pintle. Fuel is introduced through the annular orifice defined by the outer annular sleeve and exterior surface of the pintle to enable the fuel propellant to be introduced into the combustion chamber in an axial direction. Such a configuration allows the fuel and oxidizer propellants to mix in the combustion chamber.

It is also recognized and understood in the art that it is sometimes practical and advantageous to have the oxidizer as the outer flowing propellant and the fuel as the propellant flowing internal to the pintle.

There is a desire to increase the performance of rocket launchers and spacecraft through the use of high density propellants to minimize vehicle tank volume and inert weight. For an atmospheric booster flight, minimizing volume also minimizes the drag loss inefficiency of the rocket. However, compared to low density high performance propellants, such as liquid hydrogen/liquid oxygen, high density propellants usually have lower combustion temperatures and higher molecular weight exhaust that leads to low rocket engine propellant use efficiency. Unfortunately, most high performance rocket engines commonly used in the art in such applications are bipropellant and thus only use two propellants. As such, it is relatively impossible to achieve the theoretical optimum performance for a given rocket vehicle size and mission because combustion performance must always be traded against propellant density. A single rocket engine that can operate with three or more propellants can permit an optimum selection of average performance versus average propellant density for a given vehicle size and mission.

SUMMARY OF THE INVENTION

It is an object of the present invention to solve various problems in the prior art.

It is yet another object of the present invention to provide a tripropellant rocket engine which allows two different types of propellants to be alternatively mixed with a third propellant which allows the rocket performance to be optimized for a given rocket and mission.

Briefly, the present invention relates to a tripropellant coaxial pintle injector for a rocket engine which enables smooth transitioning between two types of propellants that are adapted to be alternatively mixed with a third type of propellant in a combustion chamber of a rocket engine. The tripropellant coaxial injector includes a pintle for expelling a first propellant into a combustion chamber in a generally radial direction and two or more concentric metering sleeves which define orifices for expelling two or more different propellants into the combustion chamber in an axial direction. Thus, such a configuration allows for alternative mixing of two propellants with a third propellant in the combustion chamber of a rocket engine.

DESCRIPTION OF THE DRAWINGS

These and other objects of the present invention are readily understood with reference to the following specification and the attached drawing wherein:

FIG. is a cross-sectional view of a tripropellant coaxial injector for a rocket engine in accordance with the present invention.

DETAILED DESCRIPTION

As will be described in more detail below, the tripropellant coaxial injector in accordance with the present invention allows the use of a plurality of propellants to be alternatively mixed with one or more other propellants in a combustion chamber of a rocket engine. As shown in the sole figure, a tripropellant coaxial injector, generally identified with the reference numeral 20, is illustrated having a first and second annular input propellant manifolds 22 and 24 and a third annular input propellant manifold 26. The input propellant manifolds 22 and 24 are identified as fuel manifolds while the input propellant manifold 26 is illustrated as an oxidizer manifold. It should be clear to those of ordinary skill in the art that the propellant input manifolds 22 and 24 could also be used as oxidizer manifolds and the input manifold 26 is then used for a fuel manifold. In addition, it should also be clear that although the tripropellant coaxial injector is shown with two fuel manifolds 22 and 24 and a single oxidizer manifold 26, the principals of the present invention are also applicable to a multi-propellant coaxial injector having two or more fuel manifolds and two or more oxidizer manifolds.

Referring again to the sole figure, the tripropellant coaxial injector includes an annular pintle 28 formed with a hollow cavity 30. One or more input radial passageways 32, 34 may be provided in an annular wall 36 of the pintle 28 to allow communication between the input manifold 26 and the hollow cavity 30. A rear endcap 44 may be used to close the end 40 of the pintle 28. A cone-shaped projection 38 may be disposed adjacent the endcap 44. The cone-shaped projection 38 is adapted to direct the propellant introduced into the cavity 30 by way of the passageways 32 and 34 in an generally axial direction, as generally identified by the direction of the arrow 42. The cone-shaped projection 38 may include an annular sidewall 46 that is rigidly secured to the end cap 44 which, in turn, is adapted to be secured to the pintle 28 by appropriate mechanical fasteners 48 and 50. The axial length of the annular sidewall 46 is selected so that the annular projection 38 is axially aligned with the passageways 32 and 34 to deflect the propellant entering from propellant manifold 26 in the direction indicated by the arrow 42.

An opposing end 47 of the pintle 28 is closed by a front end cap 49. A second cone type projection 52 is disposed adjacent the front end cap 49. An annular passageway 54 is formed in the pintle 28 adjacent the front end 47 by way of an annular shoulder 58, formed within the cavity 30, and the cone-shaped projection 52. The radial passageway 54 defines an annular orifice 86 adapted to enable the propellant within the hollow chamber 30 to be expelled in a generally radial direction as indicated by the arrows 60. Annular orifice 86 may consist of one continuous opening about the circumference, or alternatively may be comprised of many discrete, distributed openings to meter the flowing propellant in the most desired fashion.

An important aspect of the invention relates to the ability of the coaxial injector 20 to enable the use of three or more propellants. In particular, a pair of annular metering sleeves 62 and 64 are formed concentric to the pintle 28. The annular metering sleeves 62 and 64 define generally U-shaped slots 66 and 68, respectively, to obtain desired flow uniformity. The U-shaped slots 66 and 68 are in communication with the propellant manifolds 22 and 24 by way of one or more radial passageways 70 and 72. The annular slots 66 and 68 and orifices 82 and 84 are configured to enable the propellants from the manifolds 22 and 24 to be expelled from the orifices 82 and 84 in a generally axial direction indicated by the arrows 74 and 76. As such, the axially expelled propellants from the input manifolds 24 and 26 will mix in the rocket combustion chamber with the propellant from the manifold 26 that is being expelled radially.

The tripropellant coaxial injector 20 may be provided with an annular flange 78 that is adapted to be secured to a combustion chamber wall 80. The annular flange 78 is axially located such that the orifices 82, 84 and 86 are disposed within a combustion chamber generally represented with the reference number 88.

An N-propellant coaxial injector may be formed with annular concentric pintles or a radially compartmentalized annular pintle which allows two or more propellants to be radially introduced into the fuel chamber. In addition, three or more annular metering sleeves concentrically located relative to the annular pintle can be used to enable three or more propellants to be introduced in an axially direction in the combustion chamber.

Obviously, many modifications and variations of the present invention are possible in light of the above teachings. Thus, it is to be understood that, within the scope of the appended claims, the invention may be practiced otherwise than as specifically described above.

What is claimed and desired to be covered by a Letters Patent is as follows:

1. A tripropellant injector for a rocket engine comprising:
    a first input manifold for receiving a first propellant;
    an elongated hollow annular pintle defining a longitudinal axis and forming a generally hollow cylindrical cavity, said pintle closed on first and second opposing ends and formed with a plurality of radial passageways and in ronmnunication with said fit input manifold, said pintle also configured with a first orifice for expelling said first propellant into said combustion chamber in a radial direction;
    a second input manifold for receiving a second propellant;
    a first annular metering sleeve concentrically located relative to said longitudinal axis defining a second orifice for expelling said second propellant into said combustion chamber, said second orifice being in communication with said second input manifold;
    a third input manifold for receiving a third propellant;
    a second annular metering sleeve concentrically located relative to said longitudinal axis and said first metering sleeve defining a third orifice, said third orifice being in communication with said third input manifold, said first and second metering sleeves being disposed radially outwardly relative to said generally hollow cylindrical cavity; and
    a first cone type projection disposed adjacent said first opposing end of said pintle, said cone-type projection axially aligned with said input radial passageways to deflect said first propellant in an axial direction.

2. The tripropellant injector as recited in claim 1, wherein said first and second metering sleeves are configured to expel said second and third propellants into said combustion chamber in an axial direction.

3. The tripropellant injector as recited in claim 1, further including a second cone-shaped projection disposed adjacent said second opposing end, and said pintle is formed with an annular shoulder which, together with said cone-shaped projection forms said first orifice.

4. The tripropellant injector as recited in claim 3, wherein said first annular metering sleeve is formed as a generally U-shaped first slot and wherein said first input manifold is annular and includes one or more radial passageways in communication with said first slot.

5. The tripropellant injector as recited in claim 4, wherein said second annular metering sleeve is formed as a generally U-shaped second slot in communication with said second input manifold.

6. The tripropellant injector as recited in claim 5, wherein said second input manifold is annular and includes one or more radial passageways in communication with said second slot.

* * * * *